United States Patent Office 2,864,833
Patented Dec. 16, 1958

2,864,833

DERIVATIVES OF OXYGENATED STEROIDS

Eugene J. Agnello, Jackson Heights, N. Y., assignor to Chas. Pfizer & Co., New York, N. Y., a corporation of Delaware No Drawing. Application January 29, 1957
Serial No. 636,877

6 Claims. (Cl. 260—397.45)

This invention relates to the preparation of certain novel steroid compounds. In particular it is concerned with the preparation of a series of hitherto unknown steroid compounds derived from $\Delta^4$-pregnene-11$\beta$,14$\alpha$, 17$\alpha$,21-tetrol-3,20-dione (Compound I) which may also be called 14$\alpha$-hydroxy-hydrocortisone. This compound may be obtained by the method described in U. S. Patent 2,745,784, issued May 15, 1956, to Gilbert M. Shull et al.

The reactions involved in preparing these compounds are shown in the following outlines.

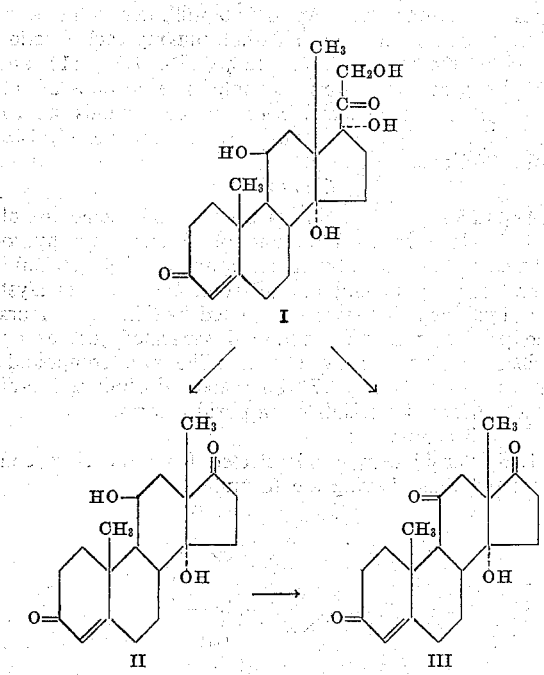

When Compound I is oxidized with sodium bismuthate, only the 17 side chain is affected, and Compound II, $\Delta^4$-androstene-11$\beta$,14$\alpha$-diol-3,17-dione, is produced. Oxidation of Compound II with chromic acid, by the standard procedure with acetic acid at room temperature, gives Compound III, $\Delta^4$-androstene-14$\alpha$-ol-3,11,17-trione. Compound III is also produced when Compound I is oxidized directly by the chromic acid method.

Both Compound II and Compound III, each of which is a novel compound, are then used as starting materials for further syntheses. The reactions involving Compound II are outlined below.

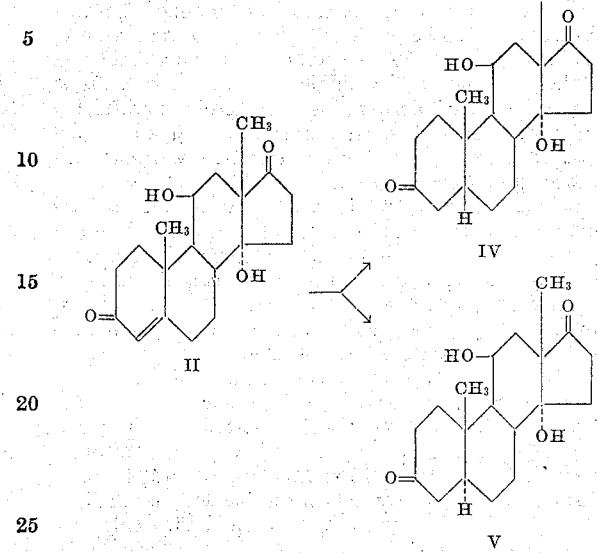

When Compound II is reacted with hydrogen in the presence of a palladium catalyst (such as palladium on calcium carbonate, palladium on barium carbonate, palladium on zinc carbonate, palladium on charcoal, etc.), the nuclear double bond at the 4 position is hydrogenated, and there is produced a mixture of Compound IV, etiocholane-11$\beta$,14$\alpha$-diol-3,17-dione, and its isomer, Compound V, androstane-11$\beta$,14$\alpha$-diol-3,17-dione. These novel compounds are separated by column chromatography. A mixture of diatomaceous earth and activated carbon has proven particularly useful.

In a similar fashion, Compound III is hydrogenated to give a mixture of etiocholane-14$\alpha$-ol-3,11,17-trione (Compound VI) and its isomer androstane-14$\alpha$-ol-3,11, 17-trione (Compound VII). These novel compounds can also be seperated by column chromatography.

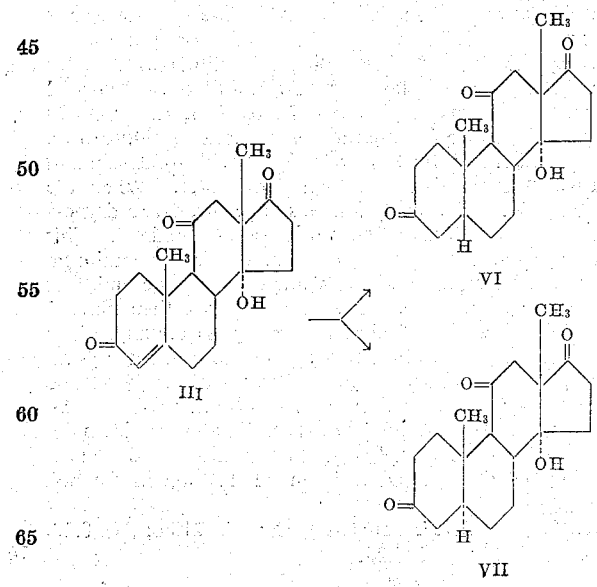

As is seen from the foregoing, many of these reactions are similar in nature. For this reason the procedures of the examples given below are general in their application, and do not apply merely to the particular reaction there being described. For example, the hydrogenation reactions for converting Compound II to Compounds IV and V and Compound III to Compounds VI and VII, are similar. They are all conducted by the same procedure, namely treating the steroid with hydrogen in the presence of a palladium catalyst. The steroid is dissolved in an inert solvent such as ethanol, methanol, propanol, etc. and stirred in the presence of hydrogen, an atmospheric pressure of which is sufficient, although elevated pressures can also be used. The catalyst advantageously contains from 5 to 25% palladium on calcium carbonate but these are not critical limits. A weight of catalyst from 1 to 10% of the weight of the steroid is preferably employed. Room temperature is the most convenient to use, since the reactions go well there, but warming may be effected to speed the reactions.

For the separation and purification of the isomers produced by the hydrogenation, both repeated fractional crystallization and column chromatography are useful, especially the latter. Florisil, silica gel, mixtures of diatomaceous earth and carbon, and other similar substances are satisfactory in the column, and various mixtures of solvents are used to elute the compounds, for example mixtures of methylene chloride and ethanol.

The ultimate nuclear-saturated products, Compounds IV, V, VI and VII, are particularly useful for their anabolic activity. In other words, they permit nitrogen-retention, an important change in the usual protein metabolism for patients involuntarily losing weight. This is accomplished without the undesirable androgenic side effects which are obtained, for instance, if testosterone or similar prior art anabolic hormones are employed. The new products are concomitantly pituitary depressants and anti-hypertensives. As is apparent from the above discussion of the process steps of the invention, the 4-unsaturated Compounds II and III find an important utility as intermediates for the synthesis of the pharmaceutically active Compounds IV through VII. They are also active in and of themselves.

The following examples are given by way of illustration only and are not to be considered as the sole embodiments of this invention. It is to be understood that protection hereof is only limited by the specific wording of the appended claims.

Example I

A mixture of 1.0 gram of 14α-hydroxyhydrocortisone and 3.2 grams of sodium bismuthate was stirred in 200 milliliters of 50% acetic acid for six hours. The excess bismuthate was destroyed by the addition of 10 milliliters of ethylene glycol. After adding 20 milliliters of 3-molar phosphoric acid solution and 450 milliliters of 3-normal potassium hydroxide solution, the resulting mixture was extracted with four 200-milliliter portions of chloroform. The combined extracts were washed with dilute sodium bicarbonate solution and then with water. When the clarified chloroform solution was concentrated to dryness in vacuo, 1.4 grams of crystalline solid remained. This was purified by dissolving the material in the minimum volume of a mixture of one volume of acetone and four volumes of benzene. The mixture was then filtered through 20 grams of alumina in a glass column. The solution was concentrated to obtain the purified crystalline product. This was recrystallized from ethyl acetate to obtain an analytical sample. This material was Δ⁴-androstene-11β,14α-diol-3,17-dione. It had a melting point of 224–226° C. $[\alpha]_D^{25°} = +69.3°$ (0.5% in dioxane). Ultraviolet absorption maximum at 241 mμ in ethanol, $\epsilon = 16,000$.

Analysis.—Calcd. for $C_{19}H_{26}O_4$: C, 71.66; H, 8.23. Found: C, 71.96; H, 8.28.

Example II 565 milligrams of 14α-hydroxyhydrocortisone was treated with 600 milligrams of chromic acid in acetic acid at room temperature. The mixture was stirred for several hours and the product was isolated by dilution and extraction with chloroform. The product was obtained as very small needles. It was purified by recrystallization from a mixture of acetone and ethyl acetate. This material, Δ⁴-androstene-14α-ol-3,11,17-trione, had a melting point of 283–285° C. and an ultraviolet absorption maximum in ethanol of 237 mμ. $\epsilon = 16,000$.

Analysis.—Calcd. for $C_{12}H_{24}O_4$: C, 72.12; H, 7.65. Found: C, 72.34; H, 7.88.

Example III

The procedure of Example II was repeated using as starting material Δ⁴-androstene-11β,14α-diol-3,17-dione. A product identical with that of Example II was isolated.

Example IV

A solution of 500 milligrams of Δ⁴-androstene-11β,14α-diol-3,17-dione in 100 milliliters of methanol was hydrogenated at 20 p. s. i. hydrogen pressure using 500 milligrams of palladium on calcium carbonate catalyst. The hydrogenation was completed in an hour. The reaction mixture from the hydrogenation was filtered and concentrated to dryness. The residue was dissolved in 200 ml. of acetone. This solution was passed through a column prepared by mixing 16.7 grams of diatomaceous earth (Celite) and 8.3 grams of activated charcoal (Darco). In preparing the column, this mixture was washed into a glass tube with several hundred milliliters of methanol. The column was then washed with acetone before the hydrogenation mixture was passed through. After application of the hydrogenation product to the column, this was followed by several 200 milliliter volumes of acetone and several 200 milliliter volumes of mixtures of acetone and methanol, making each fraction richer in methanol (e. g. 1:20, 1:10, 1.5, 1:1) and finally eluting with pure methanol. The portions of solvent were evaporated to recover the compounds, androstane-11β,14α-diol-3,17-dione and etiocholane-11β,14α-diol-3,17-dione.

Example V

A solution of 250 milligrams of Δ⁴-androstene-14α-ol-3,11,17-trione in 75 milliliters of ethanol was hydrogenated at 25 p. s. i. hydrogen pressure using 100 milligrams of 10% palladium-on-barium carbonate catalyst. The hydrogenation was completed within two hours. The product was recovered and separated just as described in Example IV above. The two compounds, androstane-14α-ol-3,11,17-trione and etiocholane-14α-ol-3,11,17-trione, were isolated in purified form.

What is claimed is:

1. A steroid compound selected from the class consisting of those having the formula

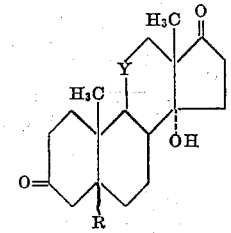

and those having the formula

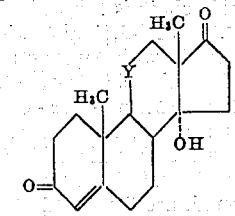

wherein Y is chosen from the group consisting of
and
and
is chosen from the group consisting of cis hydrogen and trans hydrogen.
2. Androstane-11β,14α-diol-3,17-dione.
3. Etiocholane-11β,14α-diol-3,17-dione.
4. Androstane-14α-ol-3,11,17-trione.
5. Etiocholane-14α-ol-3,11,17-trione.
6. Δ⁴-androstene-11β,14α-diol-3,17-dione.
References Cited in the file of this patent
UNITED STATES PATENTS
2,773,076   Reichstein _____ Dec. 4, 1956